UNITED STATES PATENT OFFICE.

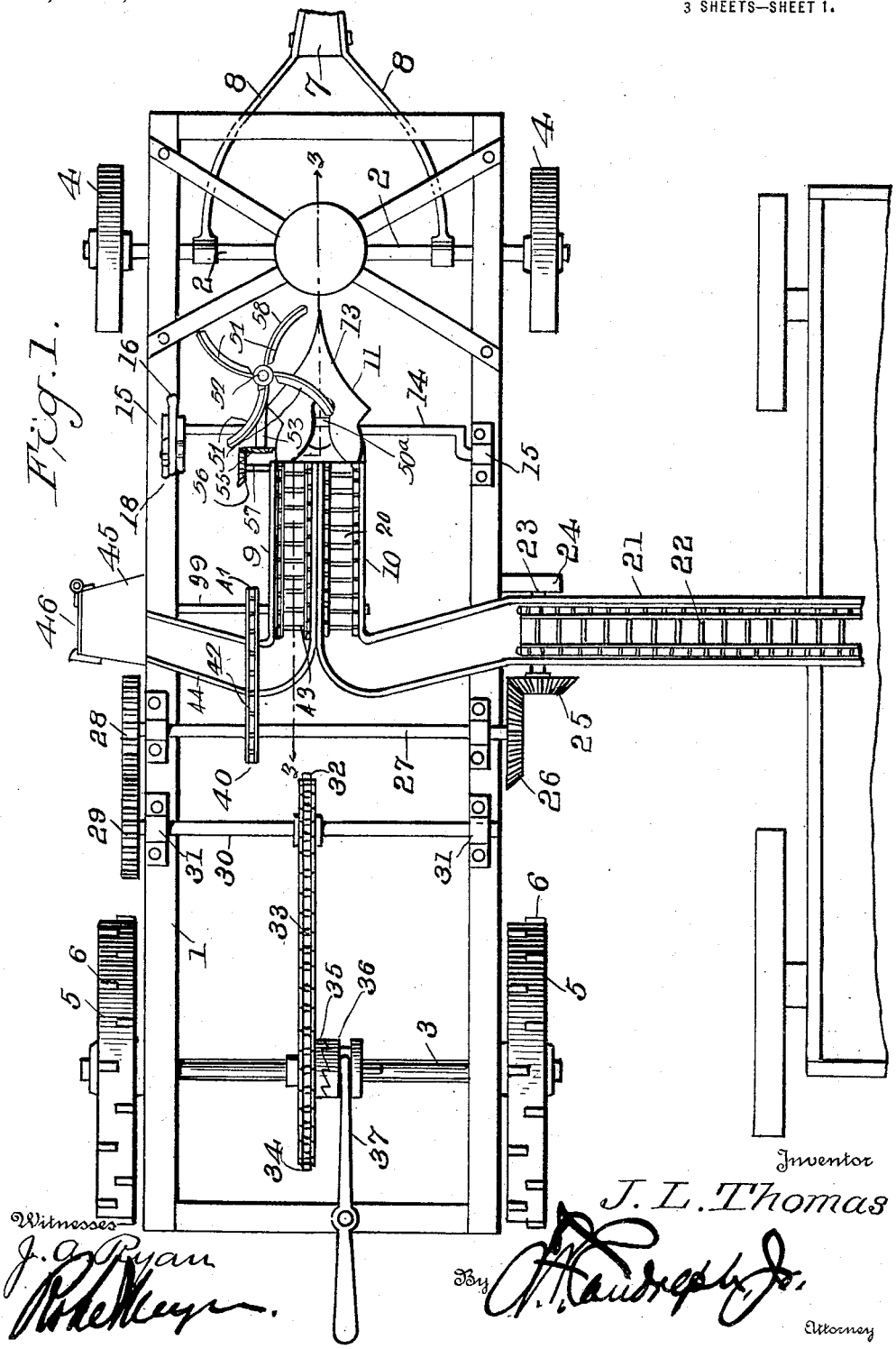

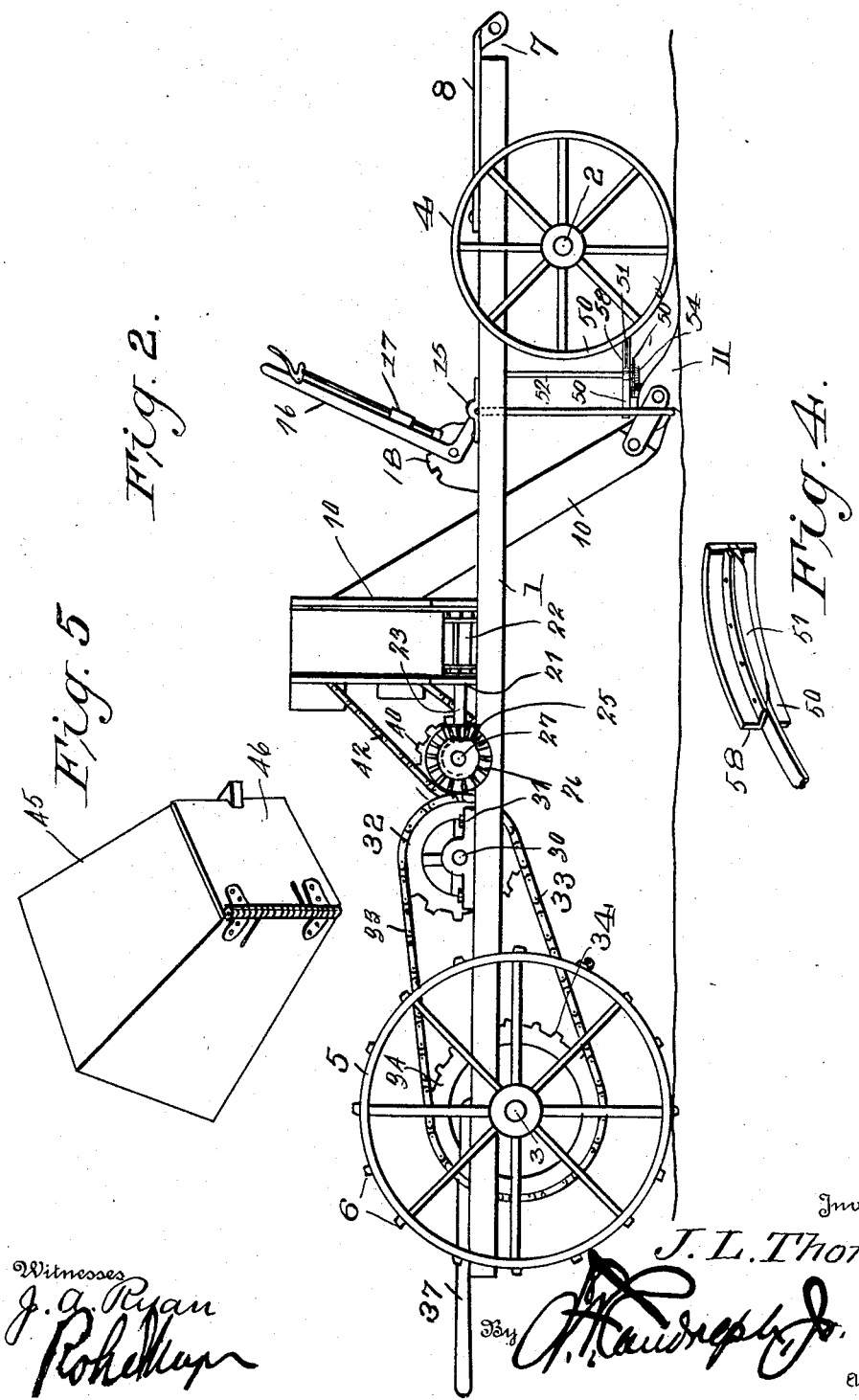

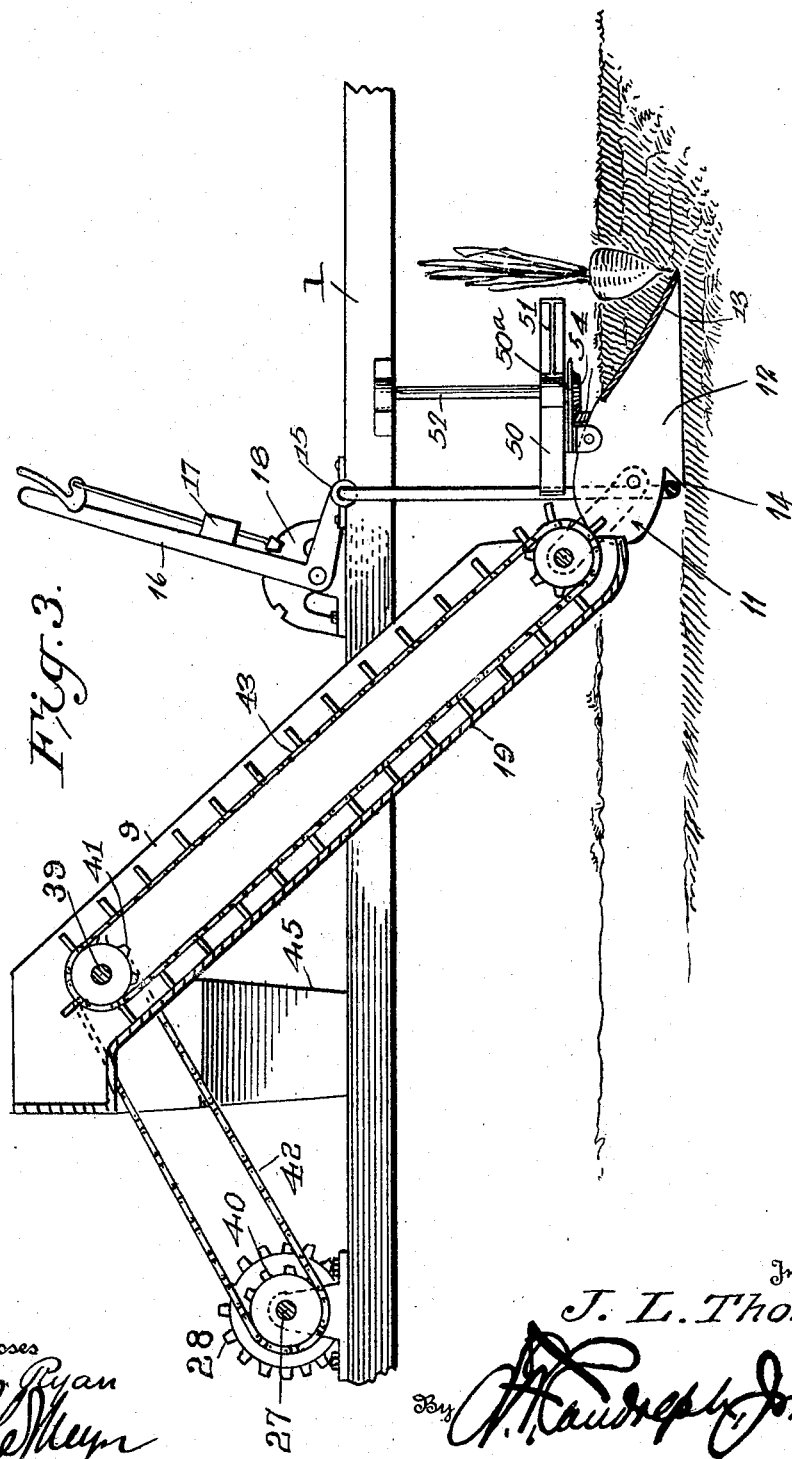

JOHN L. THOMAS, OF SCANDIA, KANSAS.

BEET-HARVESTER.

1,205,060.   Specification of Letters Patent.   Patented Nov. 14, 1916.

Application filed March 26, 1915. Serial No. 17,204.

*To all whom it may concern:*

Be it known that I, JOHN L. THOMAS, a citizen of the United States, residing at Scandia, in the county of Republic and State of Kansas, have invented certain new and useful Improvements in Beet-Harvesters; and I do hereby declare the following to be a full, clear, and exact description of the invention, such as will enable others skilled in the art to which it appertains to make and use the same.

This invention relates to beet harvesters, and the primary object of the invention is to provide a beet harvester which embodies means for uprooting the beets, topping them and conveying the beet tops and the beet bodies in opposite directions for deposit in separate piles.

Another object of this invention is to provide a novel form of beet topping mechanism which embodies a plurality of arcuate blades rotatable in a horizontal plane for cutting the tops from the beets prior to the elevation of the beet bodies, and to attach means to the knives for carrying the beet tops to an elevating conveyer for deposit in the receptacle.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like or corresponding parts throughout the several views, and in which:—

Figure 1 is a top plan view of the improved beet harvester, Fig. 2 is a side elevation of the beet harvester, Fig. 3 is a longitudinal sectional view on the line 3—3 of Fig. 1, Fig. 4 is a detail perspective view of one of the cutting knives, and Fig. 5 is a detail view of the beet top receiving receptacle.

Referring more particularly to the drawings, 1 designates the supporting structure of the beet harvester which has front and rear axles 2 and 3 rotatably carried thereby. The front axle 2 is swivelly carried by the frame, to permit of movement for guiding the direction of travel of the beet harvester, and it has the ordinary type of traction wheels 4 mounted upon its spindle ends. The shaft 3 which is carried by the rear end of the frame 1 has traction wheels 5 mounted upon the spindle end thereof which are provided with peripheral cleats 6 to prevent the skidding or slipping of the beet harvester during its operation. The frame 1 has a tongue 7 of the ordinary construction connected thereto by means of metallic brace rods 8.

The supporting frame 1 of the beet harvester has chutes 9 and 10 supported thereby, to the lower ends of which chutes is pivotally supported an uprooting plow 11. The uprooting plow 11 is formed of plates 12 and 13 which terminate in a point at the forward end of the plow and diverge rearwardly of the point, leaving a space between their facing edges, as clearly shown in Fig. 1 of the drawings. The plow structure 11 has a crank shaft 14 connected thereto, which is rotatably supported by bearings formed upon the sides of the chutes 9 and 10 and by bearings 15 which are secured to the supporting frame 1. A lever 16 is connected to one end of the crank shaft 14 and has a dog mechanism 17 associated therewith which coacts with a quadrant 18 for holding the crank shaft 14 in various adjusted positions for positioning the plow point for insertion into the ground, or above the ground in an inoperative position.

The chute 10 is positioned in the rear of the uprooting plow 11 and is provided for receiving the beets after they have been uprooted by the plow. The chute 10 extends upwardly at an incline and has a conveyer 20 mounted therein for elevating the beets. The chute 10 is bent substantially at right angles at its uppermost portion and extends downwardly, at an incline, communicating with a transversely extending chute 21. The chute 21 has a conveyer 22 mounted therein for carrying the beets outwardly to one side of the beet harvester supporting frame 1 for deposit in a wagon or any other suitable receptacle.

The conveyer 22 is operated by the rotation of a shaft 23, which is rotatably supported by suitable bearings 24 and has a beveled gear 25 mounted thereon. The beveled gear 25 meshes with a second beveled gear 26, which is mounted upon a shaft 27. The shaft 27 is rotatably carried by the supporting frame 1 and has a gear 28 mounted upon the end opposite to the one upon which the beveled gear 26 is mounted. The gear 28 meshes with a gear 29 mounted upon a shaft 30, which shaft is rotatably supported by suitable bearings 31, rearwardly of the shaft 27. The shaft 30 has a sprocket 32 mounted thereupon, about which a sprocket chain 33 travels. The sprocket chain 33 also travels about a sprocket 34 which is loosely mounted upon the rear axle 3. The sprocket 34 has a clutch segment 35 formed upon one side thereof, which is adapted for coaction with a clutch segment 36. The clutch segment 36 is feathered upon the rear axle 3, and has a lever 37 connected thereto, for sliding the clutch segment 36 into or out of engagement with the clutch segment 35, for rotating the shaft 30, and the various mechanisms operatively connected thereto, by means of the rotation of the rear axle 3.

The conveyer 20 is operated by the rotation of a shaft 39, which shaft is operatively connected to the shaft 27 by means of sprockets 40 and 41 and a sprocket chain 42. The shaft 39 also operates an elevating conveyer 43, which is positioned within the chute 9, and is provided for elevating the beet tops to the inclined section 44 of the chute 9, from whence the tops pass into a receptacle 45. The receptacle 45 is positioned to one side of the supporting frame 1 and has a spring controlled door 46 carried by the outer end thereof, by means of which the depositing of the beet tops from the receptacle may be regulated, as desired.

The supporting structure of the beet harvester carries a topping mechanism 50, which includes a plurality of knives 51, rotatable in a horizontal plane. The knives 51 are carried by a shaft 52, and are rotatable by the rotation of the shaft. The shaft 52 is rotated by a shaft 53, by means of miter or beveled gears 54. The shaft 53 is operatively connected to the shaft 57 by means of bevel gears 55 and 56. The knives 51 are positioned for engaging the beet tops immediately after they have been uprooted by the plow structure 11, and on their passage to the chute 10. The knives 51 have plates 58 secured thereto and extending transversely to the plane of the knives, which plates are provided for engaging the severed beet tops and depositing them in the chute 9, from whence they are deposited in the receptacle 45. A stationary knife blade 50$^a$ is carried by the plow structure, and the rotary knives 51 coact with this stationary blade for severing tops from the beets.

During the harvesting of beets, the uprooting plow 11 is positioned for travel along the row of beets, which plow will uproot the beets, and owing to the inclined position of the blades of the same, carry them rearwardly, for deposit in the chute 9. During the rearward movement of the beets, the knives 51, which rotate in a horizontal plane, will engage the tops of the beets and bear them against the edge of the stationary knife 50$^a$ so that the action of the knives 51 and 50$^a$ will sever them from the beet bodies. The blades or plates 58 which are carried by the knives, will during the rotary movement of the knives, carry the tops over a short distance and deposit them in the chute 9, in which they will be elevated by means of the conveyer 43, until they reach the inclined section of the chute, through which they will slide downwardly into the receptacle 45. The beet tops may be accumulated within the receptacle 45 until any desired point is reached, or until the receptacle becomes entirely filled, after which the hinged door 46 may be opened, for permitting the beet tops to fall out of the receptacle. Immediately after the tops have been cut from the beets, they will be elevated in the chute 10 by means of the elevating conveyer 20, until they reach the declined section thereof, through which they will fall or travel downwardly until engaged by the conveyer 22, which will carry them outwardly to one side of the beet harvester proper for deposit either in piles, or in any suitable type of receptacle, such as a wagon or the like.

By the movement of the clutch segment 36 into or out of engagement with the clutch segment 35, the operation of the various parts of the beet harvester, namely the topping mechanism and the various conveyers, may be controlled, as desired, during the traction of the beet harvester.

When it is desired, the plow 11 may be elevated out of a ground engaging position, by the rocking of the crank shaft 14 through the medium of the lever 16.

From the foregoing description taken in connection with the accompanying drawings the advantages of construction and of the method of operation of the improved beet harvester will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a beet harvester, a supporting frame, an uprooting mechanism, a pair of chutes carried by said supporting structure and having their forward ends positioned side by side, one of said chutes being provided for receiving the beet bodies, and the other of said chutes provided for receiving the beet tops, and a transversely extending chute communicating with the beet body receiving chutes, conveyers positioned in said chute for elevating the beet bodies and the beet tops, and means for operating said conveyers by the travel of the beet harvester.

2. In a beet harvester, a supporting structure, a beet uprooting mechanism carried by said supporting structure, a pair of chutes carried by said supporting structure and positioned side by side, one of said chutes being provided for receiving the beet bodies after uprooting, a beet topping mechanism comprising a plurality of radiating arcuate knives rotatable in a horizontal plane for cutting the tops from the beet bodies immediately after the uprooting of the beets, plates carried by said knives for carrying the beet tops a short distance and depositing them in one of said chutes, and a conveyer positioned in said chute for elevating the beet tops therein.

In testimony whereof, I affix my signature in presence of two witnesses.

JOHN L. THOMAS.

Witnesses:
JOHN E. THOMAS,
OLIVER JOHNSON.

Copies of this patent may be obtained for five cents each, by addressing the "Commissioner of Patents, Washington, D. C."